United States Patent
Bills et al.

(10) Patent No.: US 10,260,479 B2
(45) Date of Patent: Apr. 16, 2019

(54) VORTEX PROPELLER

(71) Applicants: Chris Bills, Provo, UT (US); Donald E. Moriarty, Provo, UT (US)

(72) Inventors: Chris Bills, Provo, UT (US); Donald E. Moriarty, Provo, UT (US)

(73) Assignee: Donald E. Moriarty, Provo, UT (US)

( * ) Notice: Subject to any disclaimer, the term of this patent is extended or adjusted under 35 U.S.C. 154(b) by 426 days.

(21) Appl. No.: 15/140,336

(22) Filed: Apr. 27, 2016

(65) Prior Publication Data
US 2017/0022970 A1 Jan. 26, 2017

Related U.S. Application Data

(60) Provisional application No. 62/154,024, filed on Apr. 28, 2015.

(51) Int. Cl.
| | |
|---|---|
| *F03D 3/06* | (2006.01) |
| *B63H 1/26* | (2006.01) |
| *F03D 3/00* | (2006.01) |
| *F03D 7/06* | (2006.01) |
| *B63H 1/12* | (2006.01) |

(52) U.S. Cl.
CPC ............... *F03D 3/061* (2013.01); *B63H 1/26* (2013.01); *F03D 3/005* (2013.01); *F03D 7/06* (2013.01); *B63H 2001/122* (2013.01); *Y02E 10/74* (2013.01)

(58) Field of Classification Search
CPC . F03D 3/061; F03D 3/005; F03D 7/06; B63H 1/26; B63H 2001/122; Y02E 10/74
See application file for complete search history.

(56) References Cited

U.S. PATENT DOCUMENTS

| | | |
|---|---|---|
| 4,218,175 A | 8/1980 | Carpenter |
| 4,500,259 A | 2/1985 | Schumacher |
| 5,078,632 A | 1/1992 | Ogawa et al. |
| D324,364 S | 3/1992 | Hannon et al. |
| D326,080 S | 5/1992 | Vartiala |
| D341,608 S | 11/1993 | Fries |
| 5,997,242 A | 12/1999 | Hecker et al. |
| D442,906 S | 5/2001 | Prokop |
| D457,850 S | 5/2002 | Rietsch |
| D459,285 S | 6/2002 | Rietsch |
| D560,154 S | 1/2008 | Alpin, Jr. |
| D576,539 S | 9/2008 | Tymark et al. |
| D578,460 S | 10/2008 | Tymark et al. |
| D658,563 S | 5/2012 | Hwang et al. |
| D708,136 S | 1/2014 | Eguizabal Garcia |

(Continued)

*Primary Examiner* — Dwayne J White
*Assistant Examiner* — Adam W Brown
(74) *Attorney, Agent, or Firm* — Thorpe North & Western LLP

(57) ABSTRACT

A central shaft is oriented in a position that is normal to the surface of the ground and normal to a direction of fluid flow. The central shaft has a plurality of blades emanating from the central shaft, wherein each one of the plurality of blades has an outside edge and an inside edge, the inside edge being attached directly to an outside surface of the central shaft. The outside edge of the blade extends upward curving around the central shaft and the inside edge of the blade extends upward curving around the central shaft. The turn rate of the inside edge of the blades about the central shaft is less than the turn rate of the outside edge of the blades about the central shaft.

18 Claims, 13 Drawing Sheets

(56) References Cited

U.S. PATENT DOCUMENTS

| | | |
|---|---|---|
| 8,905,706 B2 * 12/2014 | Bills | F03D 1/0633 |
| | | 415/72 |
| D722,965 S 2/2015 | Perless et al. | |
| 9,004,851 B1 4/2015 | Garza | |
| 2007/0018464 A1 1/2007 | Becker | |
| 2007/0029807 A1 * 2/2007 | Kass | F03D 3/065 |
| | | 290/55 |
| 2008/0095631 A1 4/2008 | Bertony | |
| 2009/0257880 A1 10/2009 | Clark | |
| 2010/0003130 A1 1/2010 | Gual | |
| 2010/0196144 A1 8/2010 | Morris | |
| 2010/0278650 A1 11/2010 | Parker | |
| 2011/0006542 A1 1/2011 | Burrell, IV | |
| 2011/0081243 A1 4/2011 | Sullivan | |
| 2011/0081244 A1 4/2011 | Ro | |
| 2011/0164977 A1 7/2011 | Vallejo | |
| 2011/0206526 A1 8/2011 | Roberts | |
| 2011/0255975 A1 10/2011 | Perless et al. | |
| 2011/0311363 A1 * 12/2011 | Bills | F03D 1/0633 |
| | | 416/176 |
| 2012/0076656 A1 * 3/2012 | Abass | F03B 3/121 |
| | | 416/176 |
| 2012/0128500 A1 5/2012 | Perless et al. | |
| 2012/0183407 A1 * 7/2012 | Vallejo | F03D 3/061 |
| | | 416/228 |
| 2012/0242088 A1 9/2012 | Raz et al. | |
| 2013/0343891 A1 12/2013 | Rajakaruna et al. | |
| 2013/0343897 A1 12/2013 | Collins | |
| 2015/0300177 A1 10/2015 | Mieremet et al. | |
| 2017/0022970 A1 1/2017 | Bills et al. | |

* cited by examiner

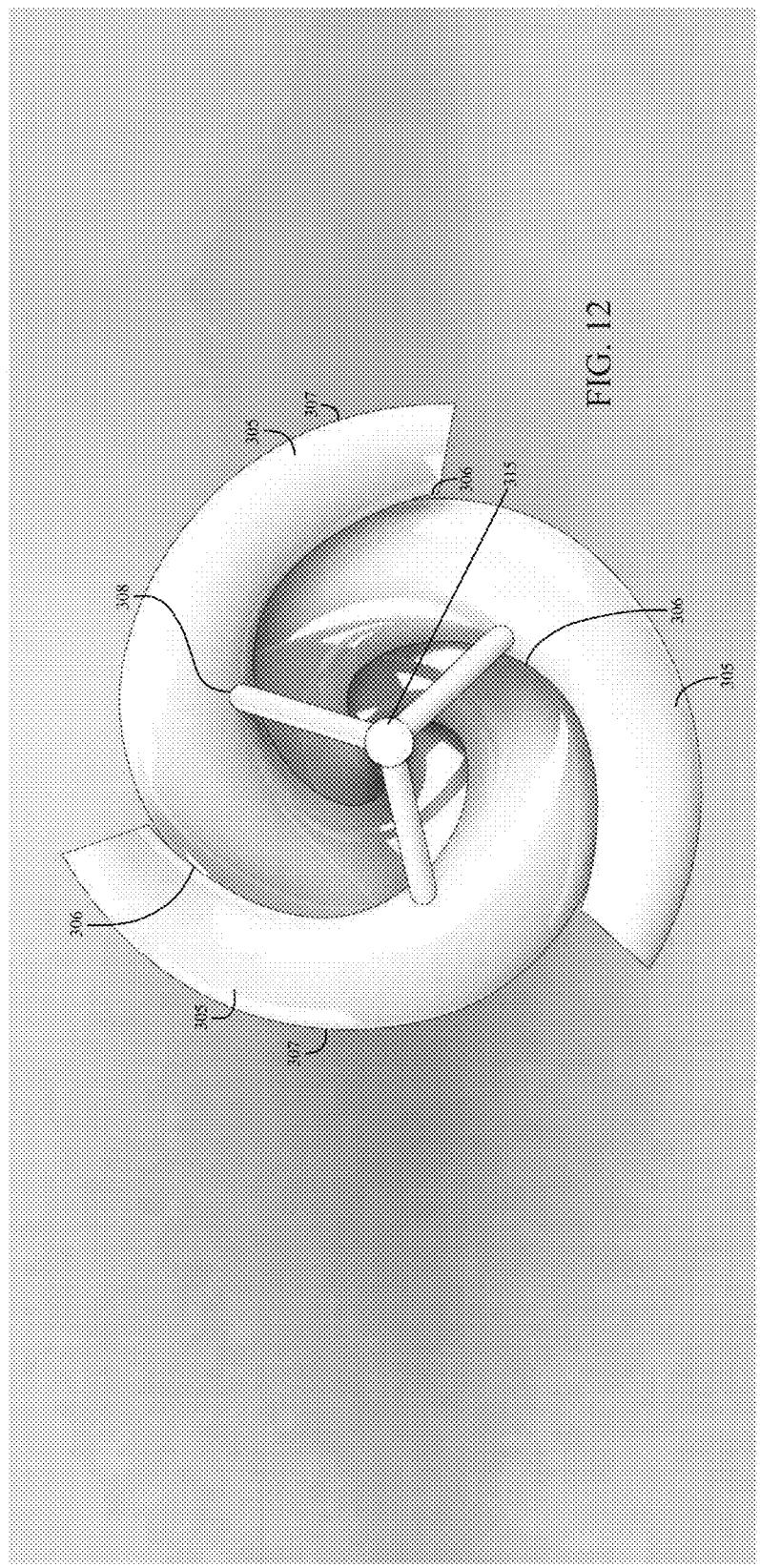

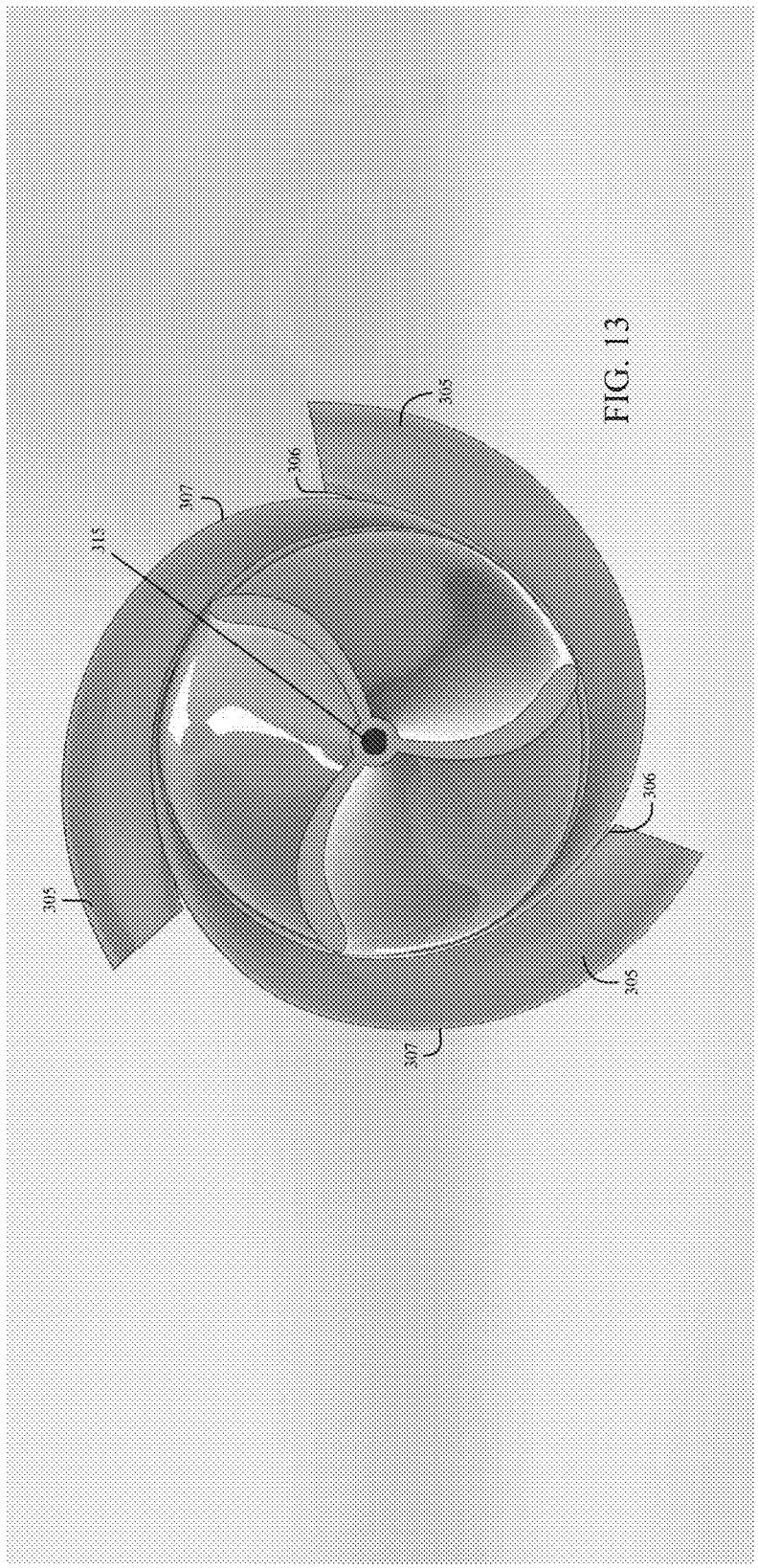

VORTEX PROPELLER

PRIORITY CLAIM

The present invention claims priority to U.S. Provisional Patent Application No. 62/154,024 filed on Apr. 28, 2015 entitled "Vortex Propeller" which is incorporated herein by reference in its entirety.

FIELD OF THE INVENTION

The present invention relates generally to propeller devices, and more particularly to propellers for turning a turbine or being turned by a powered device such as an engine to create propulsion.

BACKGROUND

Propeller blades are designed to generate the maximum power at the minimum cost. The design of those blades is driven primarily by aerodynamic requirements. However, economics requires that the blade shape constitute a compromise to optimize the cost of construction versus the value of power production. The blade design process starts with a "best guess" compromise between aerodynamic and structural efficiency. The choice of materials and manufacturing process will also have an influence on how thin (hence aerodynamically ideal) the blade can be built (e.g., carbon fiber is stiffer and stronger than infused glass fiber). The chosen aerodynamic shape gives rise to loads, which are fed into the structural design. Problems identified at this stage can then be used to modify the shape, if necessary, and recalculate the aerodynamic performance.

With respect to power derived from wind turbines, the available power varies as the cube of the wind speed—accordingly, twice the wind speed equals eight times the power. Typically, wind speeds below about 5 m/s (10 mph) do not create sufficient power to be useful. Conversely, strong gusts provide extremely high levels of power. However, it is not economically viable to build turbines to optimize power peaks as their capacity would be wasted during intervals between gusts. In addition to day-to-day variations in wind power, the wind is subject to instantaneous variability due to turbulence caused by land features, thermal influences, and weather. Moreover, wind velocity tends to be greater above the ground due to surface friction. All these effects lead to varying loads on the blades of a turbine as they rotate.

The turbine itself has an effect on the wind. Downwind of the turbine, air moves more slowly than upwind. The wind starts to slow down even before it reaches the blades, reducing the wind speed through the "disc" (the imaginary circle formed by the blade tips, also called the swept area) and hence reducing the available power. Some of the wind traveling in the direction of the disc diverts around the slower-moving air and misses the blades entirely. Thus, there is an optimum amount of power to extract from a given disc diameter (i.e., if one attempts to take too much and the wind will slow down too much, reducing the available power). In fact, in a traditional windmill configuration, it is believed that an ideal design would reduce the wind speed by about two thirds downwind of the turbine, though even then the wind just before the turbine will have lost about a third of its speed. This allows a theoretical maximum of 59% of the wind's power to be captured (referred to as Betz's limit). It is believed that in practice only 40-50% of the wind's available power is captured by current designs.

It is therefore desirable to have an improved propeller design that captures more of the available power from wind power and to solve other problems related to the harvesting of wind power.

SUMMARY OF THE INVENTION

In light of the problems and deficiencies inherent in the prior art, the present invention seeks to overcome these by providing a vertically oriented propeller, in accordance with one aspect of the technology, comprising a central shaft oriented in a position that is normal to the surface of the ground and normal to a direction of fluid flow F. A plurality of blades emanate from the central shaft, wherein each one of the plurality of blades comprises an outside edge and an inside edge, wherein the inside edge is coupled to the central shaft.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 12 is a top view of the propeller of FIG. 11; and

FIG. 13 is a bottom view of the propeller of FIG. 11.

DETAILED DESCRIPTION OF EXAMPLE EMBODIMENTS

Figure 1:
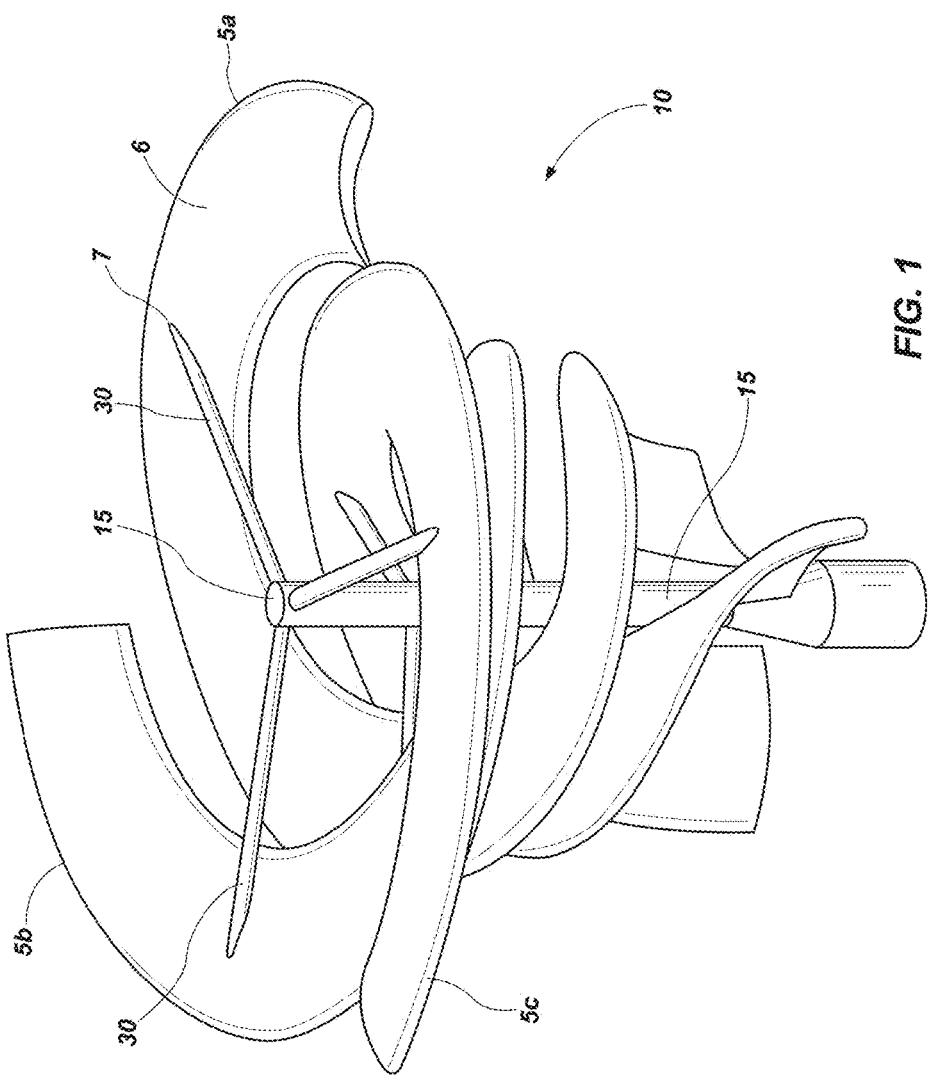
FIG. 1 shows a perspective view of a three blade vortex propeller in accordance with one embodiment of the present invention.
Figure 2:
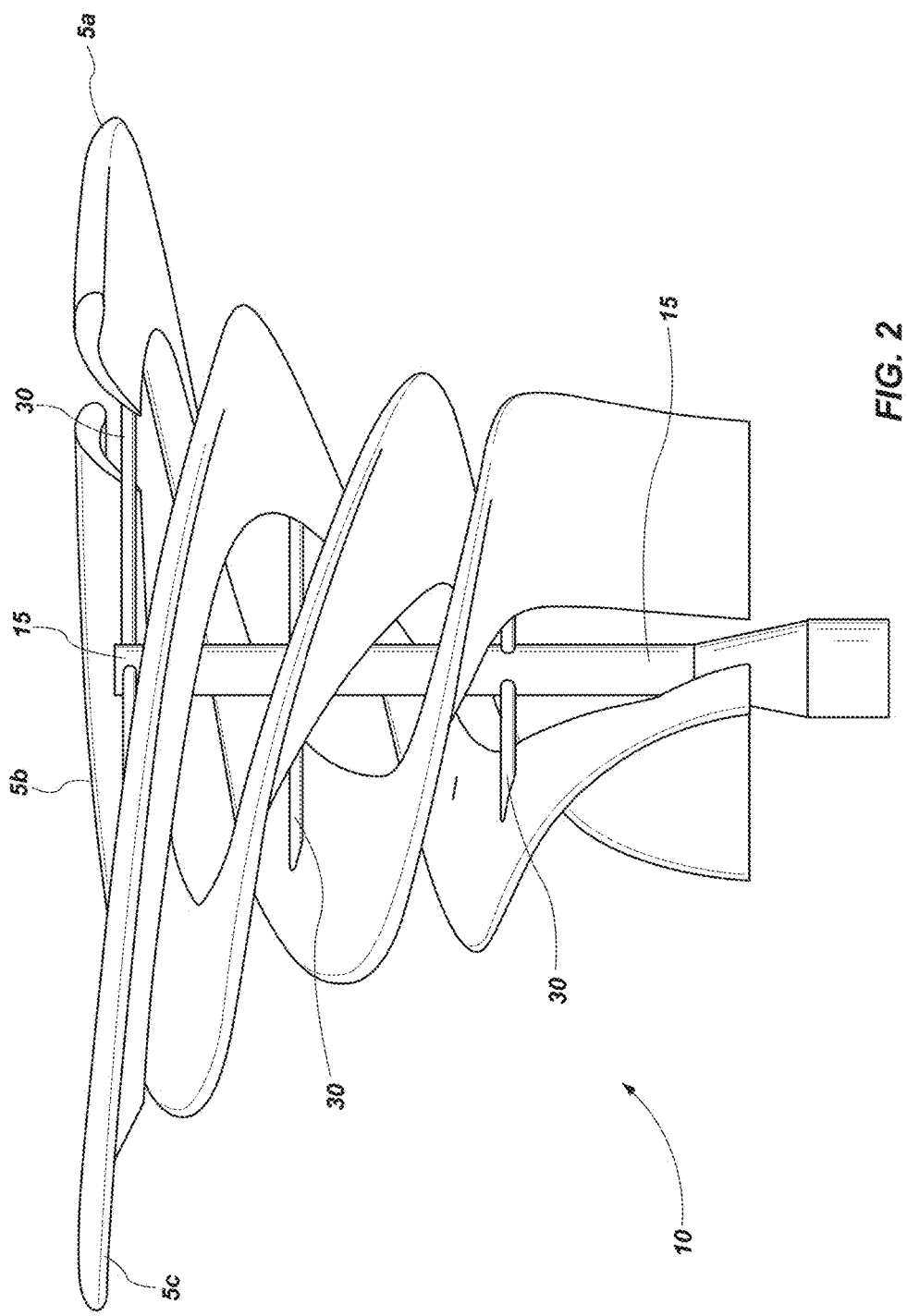
FIG. 2 shows a side view of the propeller of FIG. 1.
Figure 3:
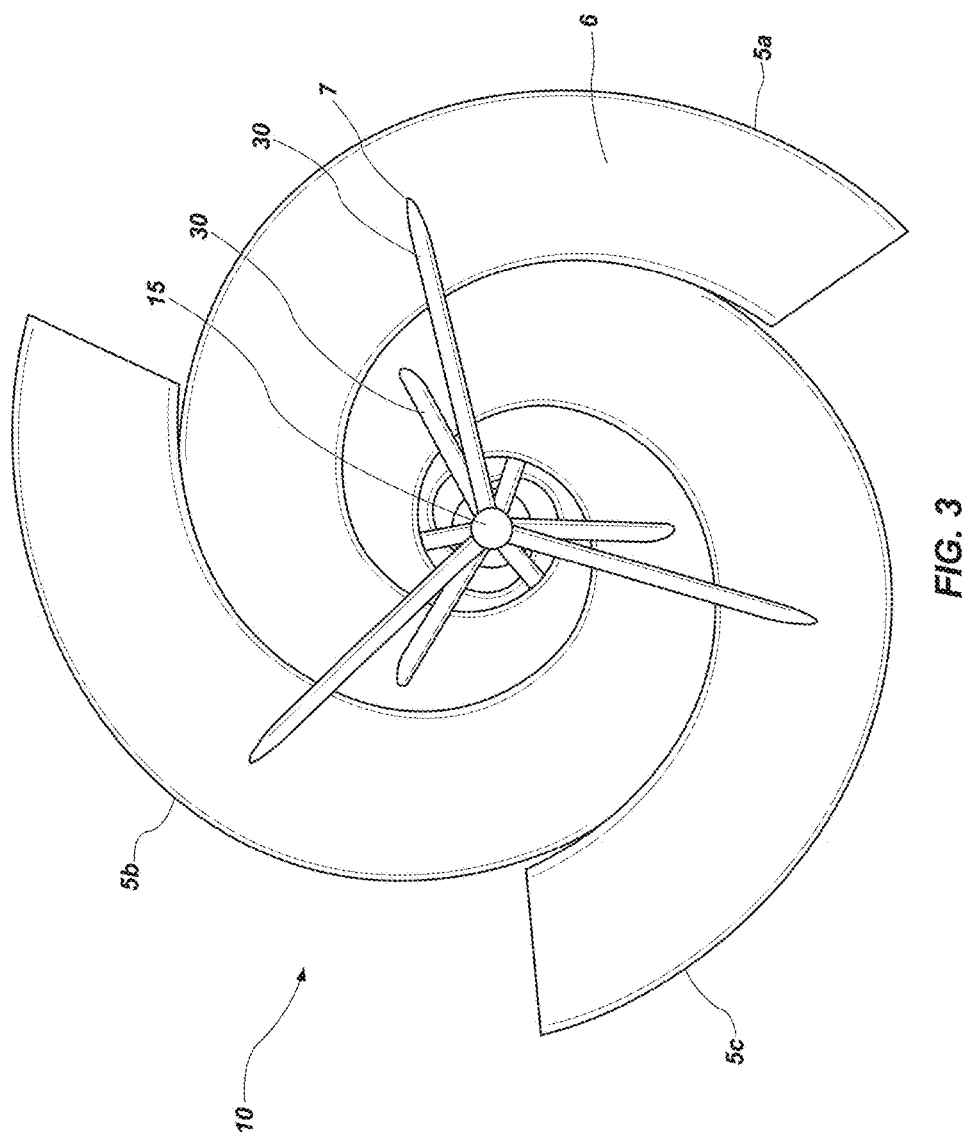
FIG. 3 shows a top view of the propeller of FIG. 1.
Figure 4:
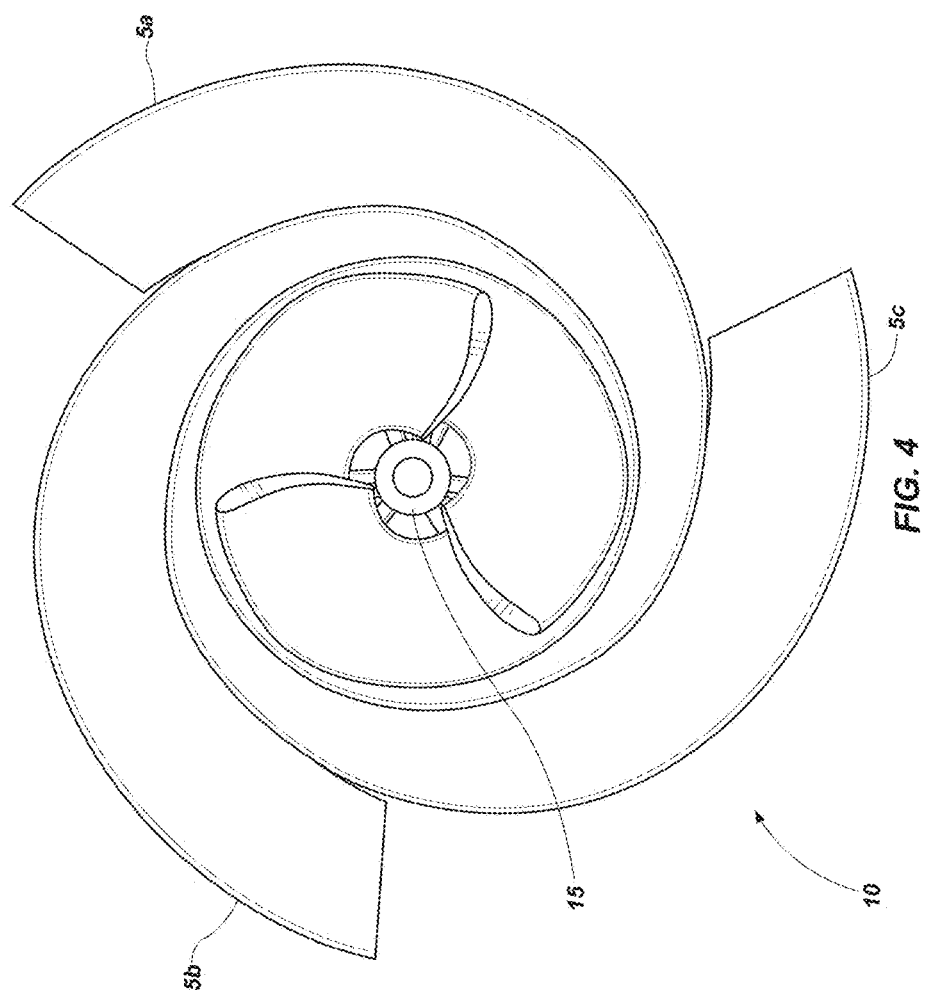
FIG. 4 shows a bottom view of the propeller of FIG. 1.
Figure 5:
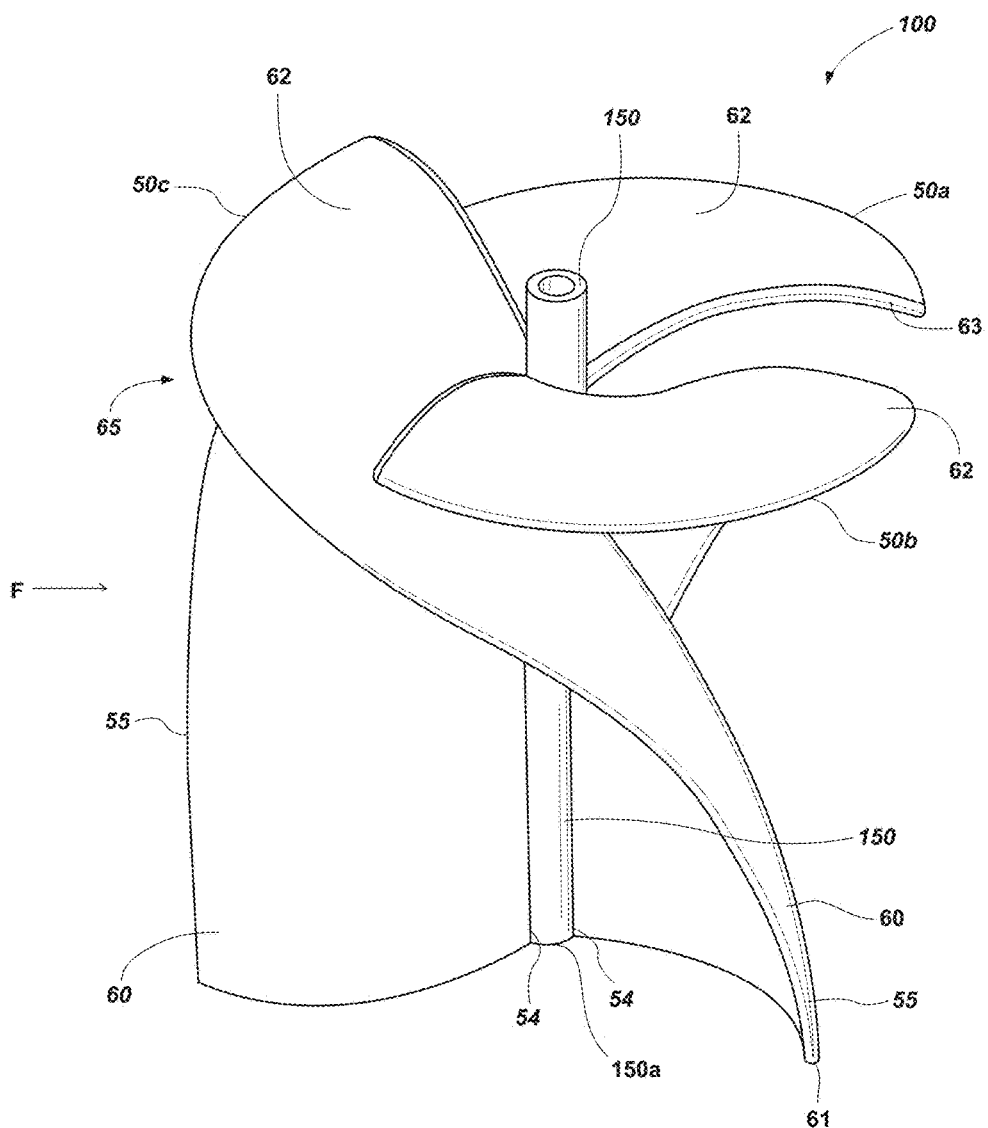
FIG. 5 shows a perspective view of a three blade vortex propeller in accordance with one embodiment of the present invention.
Figure 6:
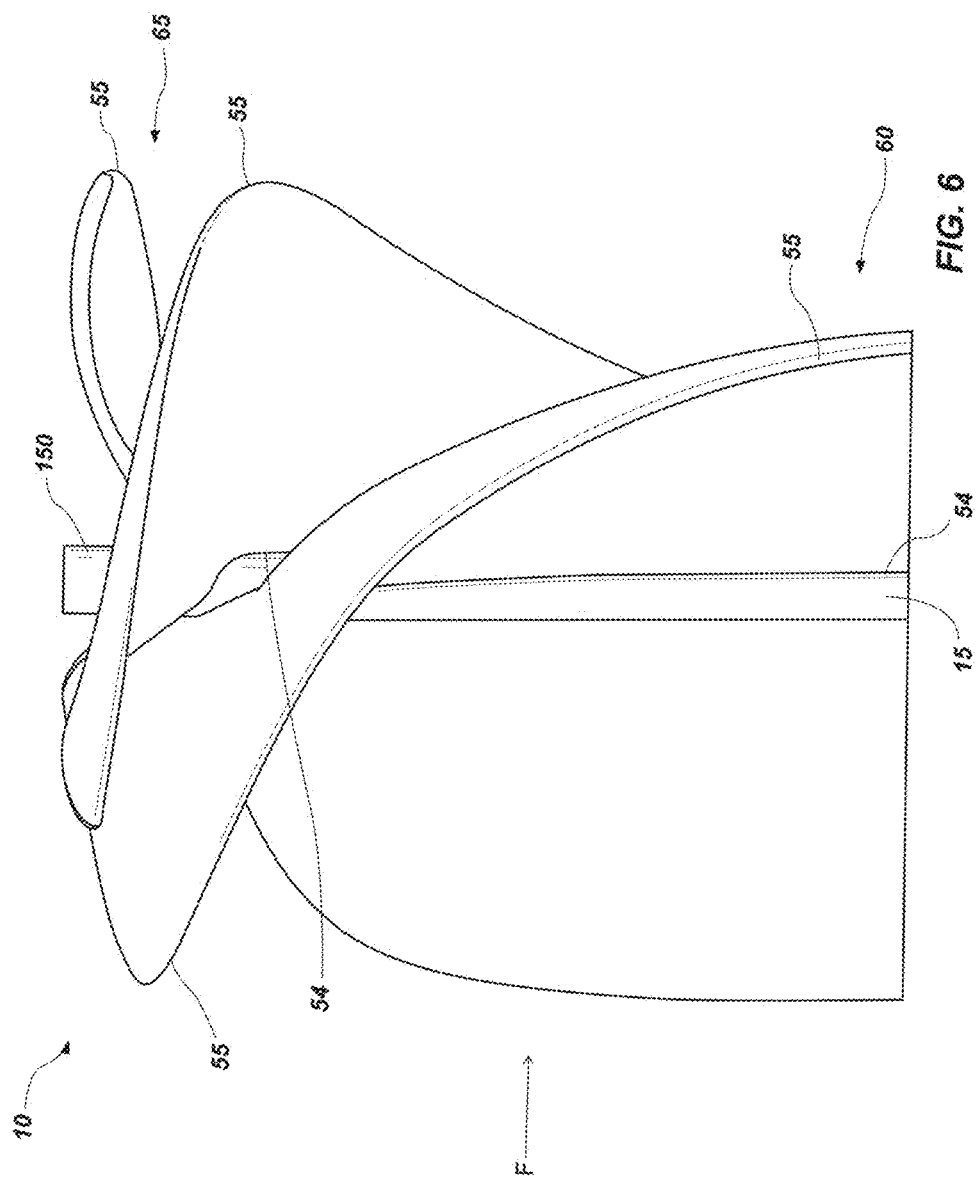
FIG. 6 shows a side view of the propeller of FIG. 5.
Figure 7:
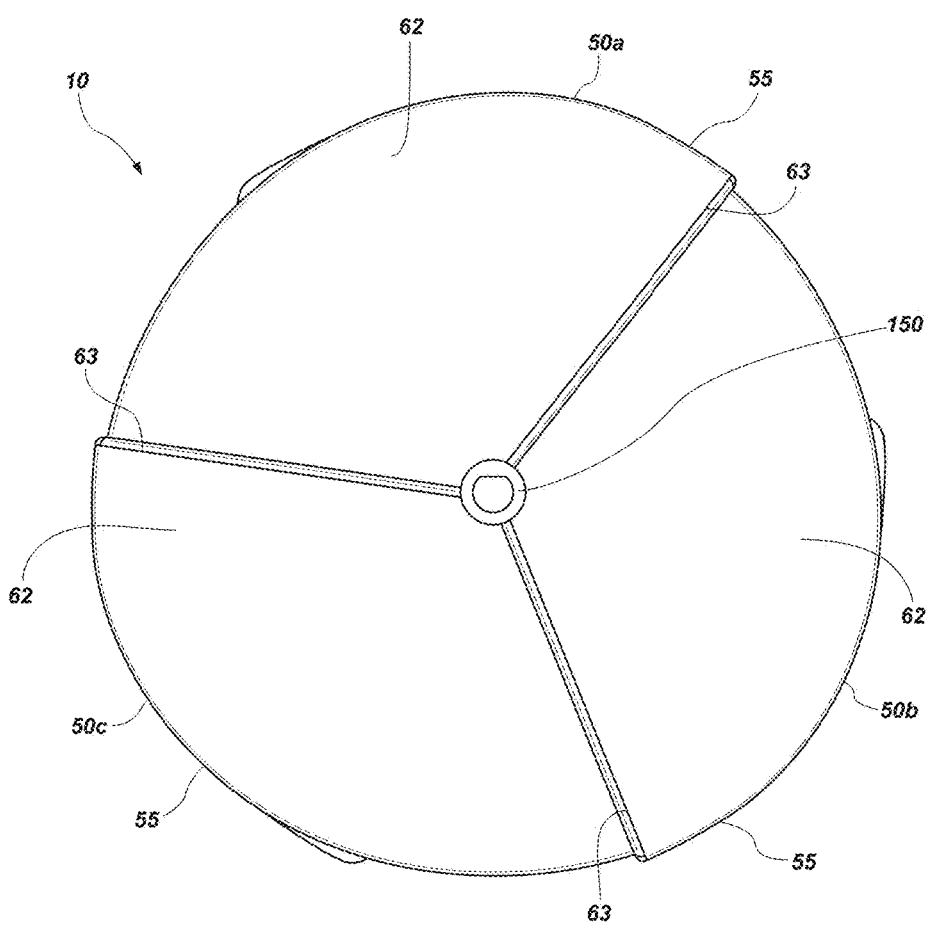
FIG. 7 shows a top view of the propeller of FIG. 5.
Figure 8:
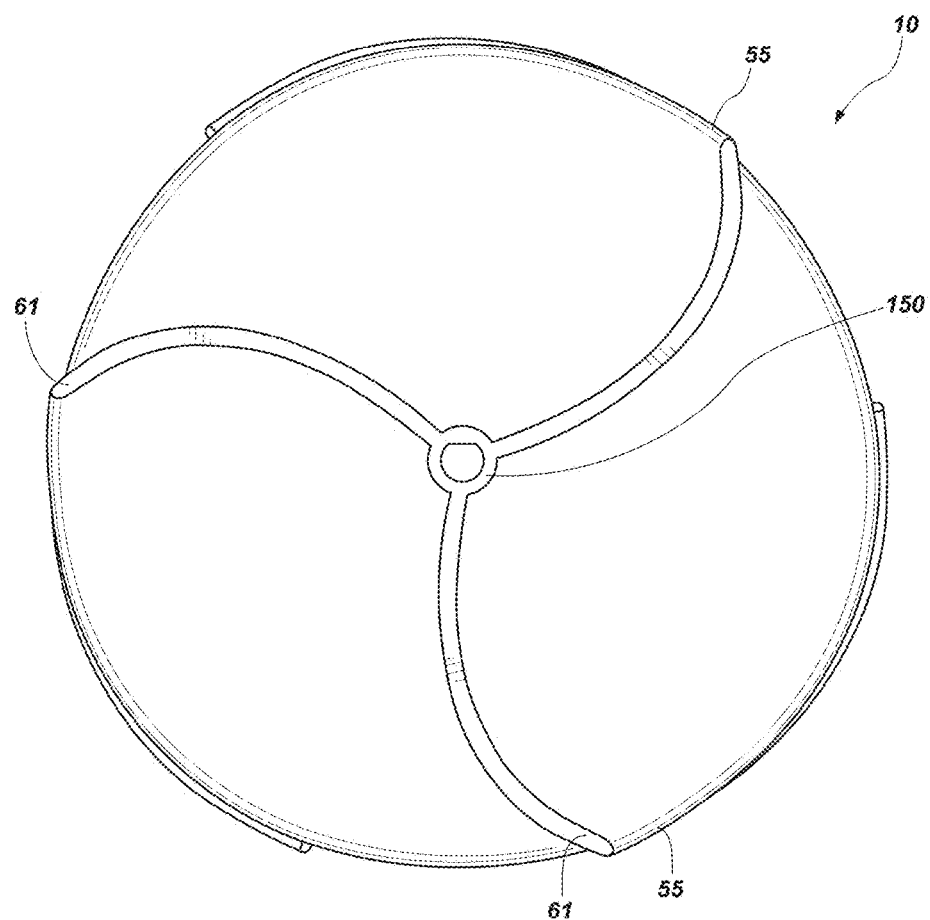
FIG. 8 shows a bottom view of the propeller of FIG. 5.

The following detailed description of exemplary embodiments of the invention makes reference to the accompanying drawings, which form a part hereof and in which are shown, by way of illustration, exemplary embodiments in which the invention may be practiced. It is believed that an alternative propeller design which utilizes the natural vortex behavior of fluids would greatly increase turbine efficiencies and/or the propulsive efficiency of a propeller. However, before the present invention is disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

In describing and claiming the present invention, the following terminology will be used in accordance with the definitions set forth below.

It is to be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Methods and systems are set forth herein for optimizing propeller efficiency. Particular embodiments set forth methods and systems for turning a turbine using a vortex-shaped propeller. In one aspect, the vortex-shaped propeller comprises solid portions enabling at least some irrotational flow about portions of the propeller and open portions enabling fluid flow (e.g., wind) through the propeller to induce propeller rotation. In another aspect, the vortex shaped propeller comprises one or more blades having an inside edge that is coupled to a central axis. Additional aspects of the invention are described more fully herein.

It should be understood that the embodiments discussed herein are contemplated for use with any type of device where rotation of a device (e.g., induced from the flow of a fluid or vice versa) is desired, and any type of vehicle that can be made to move about. For purposes of illustrating the various aspects of the methods and systems claimed herein, the discussion below will be primarily directed to describing exemplary embodiments directed to wind turbines. It should be noted, however, that the elements and principles discussed herein are applicable to other turbines and/or devices for generating power or inducing propulsion (i.e., acting as a propeller on a boat, for example).

It is also noted that discussion of methods and systems herein can be interchangeable with respect to specific embodiments. In other words, specific discussion of one method or system (or components thereof) herein is equally applicable to other embodiments as they relate to the system or method, and vice versa.

Number of Blades

The greater number of blades used in connection with a turbine, the less power each can extract. The total blade area as a fraction of the total swept disc area is called the solidity. Aerodynamically, there is an optimum solidity for a given tip speed; the higher the number of blades, the narrower each blade must be. In traditional wind turbines, the optimum solidity is low (only a few percent) which means that even with only three blades, each one must be very narrow. To slip through the air easily the blades must be thin relative to their width, so the limited solidity also limits the thickness of the blades. However, the thinner blades become, the more expensive they are to construct in order to meet the structural demands placed on the blades.

Just like the wing of an airplane, wind turbine blades work by generating lift due to their shape. The more curved side generates low air pressures while high pressure air pushes on the other side of the airfoil. The net result is a lift force perpendicular to the direction of flow of the air. The lift force increases as the blade is turned to present itself at a greater angle to the wind. This is called the angle of attack. At very large angles of attack the blade "stalls" and the lift decreases again. As such, there is an optimum angle of attack to generate the maximum lift. There is, unfortunately, also a retarding force on the blade: the drag. This is the force parallel to the wind flow which also increases with the angle of attack. In an appropriately shaped airfoil, the lift force is much bigger than the drag. However, at very high angles of attack, especially when the blade stalls, the drag increases dramatically. As such, the blade reaches its maximum lift/drag ratio at an angle slightly less than the maximum lift angle.

As drag is in the downwind direction, it would seem drag would not slow down a turbine rotor as the drag would be parallel to the turbine axis. That is, it would only create "thrust", the force that acts parallel to the turbine axis and hence has no tendency to speed up or slow down the rotor. When the rotor is stationary (e.g., just before start-up), this is indeed the case. However, the blade's own movement through the air means that, the wind is blowing from a different angle. This is called apparent wind. The apparent wind is stronger than the true wind but its angle is less favorable: it rotates the angles of the lift and drag to reduce the effect of lift force pulling the blade around and increase the effect of drag slowing it down. It also means that the lift force contributes to the thrust on the rotor. As a result, to maintain an optimal angle of attack, the blade must be turned further from the true wind angle.

Twist

Rotating turbine blades travel faster at the blade tip than at the root, hence there is a greater apparent wind angle. Because of the increased velocity at varying points about the length of the blade, the optimal angle of attack of the blade also varies about the length of the blade. Accordingly, the blade must be turned further at the tips than at the root. In other words, the blade is ideally built with a twist along its length. In traditional windmill designs, the twist is around 10-20° from root to tip.

In addition to blade twist, optimal lift/drag characteristics are obtained by an airfoil that is fairly thin—its thickness ideally might be only 10-15% of its "chord" length (the length across the blade, in the direction of the wind flow). Other structure requirements, however, demand that the blade be designed to support lift, drag and gravitational forces. These structural requirements generally mean the airfoil needs to be thicker than the aerodynamic optimum, especially at locations towards the root (where the blade attaches to the hub) where the bending forces are greatest. Fortunately, that is also where the apparent wind is moving more slowly and the blade has the least leverage over the hub. As such, some aerodynamic inefficiency at that point has less impact on overall performance than inefficiencies near the blade tip.

To increase thickness near the root without creating a very short, fat, airfoil section, some designs use a "flatback" section. This is either a standard section thickened up to a square trailing (back) edge, or a longer airfoil shape that has been truncated. This reduces the drag compared to a rounder section.

Blade Shape

The planform shape is traditionally used to give the blade an approximately constant slowing effect on the wind over the whole rotor disc (i.e., the tip slows the wind to the same degree as the center or root of the blade). This ensures that none of the air leaves the turbine too slowly (causing turbulence), yet none is allowed to pass through too fast (which would represent wasted energy).

Because the tip of the blade is moving faster than the root, it passes through more volume of air, hence it must generate a greater lift force to slow that air down. Fortunately, lift increases with the square of speed so its greater speed generates sufficient lift. In practice, the blade can be narrower close to the tip than near the root and still generate enough lift. The optimum tapering of the blade planform as it goes outboard can be calculated. Roughly speaking, the chord should be inverse to the radius (e.g., if the chord was 2 m at 10 m radius, it should be 10 m at 1 m radius). This relationship breaks down close to the root and tip, where the optimum shape changes to account for tip losses. In practice, a fairly linear taper is sufficiently close to the optimum for most designs. It is also thought to be structurally superior and easier to build than the optimum shape.

Rotational Speed

The speed at which the turbine rotates is a fundamental choice in the design, and is defined in terms of the speed of the blade tips relative to the "free" wind speed (i.e., before the wind is slowed down by the turbine). This is called the tip speed ratio. High tip speed ratio means the aerodynamic force on the blades (due to lift and drag) is almost parallel to the rotor axis. As such, it relies on a good lift/drag ratio. Low tip speed ratio would seem like a better choice but unfortunately results in lower aerodynamic efficiency, due to two effects. Because the lift force on the blades generates torque, it has an equal but opposite effect on the wind, tending to push it around tangentially in an opposite direction. The result is that the air downwind of the turbine has "swirl" (i.e., it spins in the opposite direction to the blades). That swirl represents lost power which reduces the available power that can be extracted from the wind. Lower rotational speed requires higher torque for the same power output, so lower tip speed results in higher wake swirl losses.

The other reduction in efficiency at low tip speed ratio comes from tip losses, where high-pressure air from the upwind side of the blade escapes around the blade tip to the low-pressure side, thereby wasting energy. As power equals force times speed, at slower rotational speed, the blades need to generate more lift force to achieve the same power. To generate more lift for a given length the blade has to be wider. This means, geometrically speaking, that a greater proportion of the blade's length can be considered to be close to the tip. Thus, more of the air contributes to tip losses and the efficiency decreases. Various techniques can be used to limit tip losses such as winglets (commonly seen on airliners) but few are employed in practice owing to their additional cost.

The higher lift force on a wider blade also translates to higher loads on the other components such as the hub and bearings. As such, low tip speed ratio will increase the cost of these items. On the other hand, the wide blade is better able to carry the lift force (as discussed previously), so the blade itself may be cheaper.

All this means that turbine designers typically compromise on tip speed ratios in the region of 7-10, so at design wind speed (usually 12-15 meters per second) the blade tip can be moving at around 120 m/s (approximately 270 miles per hour). Practical limits on the absolute tip speed include bird impacts and rain erosion, as well as noise, all of which increase with tip speed.

Power and Pitch Control

For an economical design, the maximum performance of the generator and gearbox of a wind turbine, for example, are limited to an appropriate level for the operating environment of a particular turbine. Ideally, the turbine should be able to extract as much power as possible from the wind up to the rated power of the generator, then limit the power extraction at that level as the wind increases further.

If the blades' angle is kept constant, the turbine is unable to respond to changes in wind speed. This enables an optimum angle of attack to generate the maximum power at varying wind speeds, however, the only way to "depower" the machine in high wind speeds is by relying on the blades to stall (known as passive stall control). This is the non-flat power curve above the rated wind. Accordingly, to limit the maximum power, a passive stall-controlled turbine will usually be operating somewhat below its maximum potential.

If instead the blades are attached via a bearing that allows the angle of attack to be varied (active pitch control), the blades can be angled to maintain optimum efficiency right up to the design wind speed (at which the generator is producing its rated output). Above the design wind speed, blades can be "feathered" (i.e., rotated in pitch to decrease their angle of attack and hence their lift, and thus controlling the power). In survival conditions, the turbine can be stopped altogether and the blades feathered to produce no turning force at all.

An alternative to decreasing the angle of attack above the design wind speed comprises an increase to the angle to the point where the blade stalls (active stall control). This decreases lift and increases drag, which has the desired slowing effect on blade rotation and also less sensitive to gusts of wind than feathering. That is, by decreasing the apparent wind angle, gusts increase the angle of attack which tend to make the blade stall more. Therefore, controlling blade speed by stall rather than feathering can be beneficial in gusty conditions.

In accordance with one embodiment of the invention, a propeller is disclosed which approximates the shape of a vortex. Broadly speaking, the propeller comprises a plurality of blades terminating in the shape of a perimeter of a circle. Each of the blades extends outwardly and away from the circle in a helical (or spiral) orientation. At some distance away from the circle, the radius of the spiral increases such that the proximate blades approximate the shape of a funnel. At the distal end (or beginning point) of the propeller, each of the terminating portions of the blades are equidistant from one another about the perimeter of an imaginary circle and equidistant from a central axis. The center of the imaginary circle is collinear with the central axis about which each of the blades is disposed.

In another embodiment of the present invention, broadly speaking, the propeller comprises a plurality of blades terminating in the shape of a perimeter of a circle. Each of the blades twists about a center in a helical (or spiral) orientation. At some distance away from the center, the radius of the twist closes the blades in on themselves without touching an adjacent blade. At the distal end (or beginning point) of the propeller, each of the terminating portions of the blades are equidistant from one another about the perimeter of an imaginary circle and equidistant from a central axis. The center of the imaginary circle is collinear with the central axis about which each of the blades is disposed. An inner edge of each of the blades is always in contact with the central axis.

With reference to an embodiment related to use of the vortex-shaped propeller to power a wind turbine, the vortex-shaped propeller is configured to capture the flow of wind and induce irrotational flow about the inside of the vortex-shaped propeller. The pitch and twist of the blades of the propeller are configured to optimize the angle of attack and the number of blades associated with the propeller are configured to optimize the lift of each blade as well as the total swept disc area. The angle of attack and lift associated with the propeller configuration varies significantly from traditional propeller designs, in part, due to the difference in the air flow regime created by the vortex-shaped propeller itself. In another embodiment, the vortex-shaped propeller may be attached to a device (e.g., a motor) capable of causing the propeller to rotate despite the absence of any wind or fluid flow. In this manner, the vortex-shaped propeller may be utilized to induce fluid flow to propel a vehicle or for some other suitable purpose.

As noted above, the propeller device can comprise a plurality of blades disposed together to approximate the shape of a vortex. The beginning points of each of the plurality of blades are disposed equidistant about the perimeter of an imaginary circle, wherein the center of the imaginary circle is collinear with the central axis. The beginning points may be laterally spaced very close to the center of the imaginary circle (almost zero) leaving essentially no hole at the end of the vortex, or they may be laterally spaced apart from the center to create a large hole at the end of the vortex. In one aspect of the invention, the plurality of blades are fixed to the central axis with lateral supports extending outward from the central axis. In another aspect, one edge of the blades is substantially in contact with the central axis.

With specific reference now to the figures, FIGS. 1 through 4, in accordance with one embodiment of the present invention, a vortex shaped propeller 10 is disclosed. It is believed that the flow of wind resulting from the innovative propeller design shall focus energy flow more toward the center or rotor, rather than the blade tips. The blade configuration creates a natural transition of flow from resistant to directional as it pulls to the center. As the air flows toward the center of the blade, it is believed it will speed up (due to Bernoulli's principle) thereby increasing the speed of air applied to the inner portion of the propeller 10. FIGS. 1 through 4 show a three-blade configuration in accordance with one embodiment of the present invention. Each of the blades 5a, 5b, and 5c, of the propeller 10 comprise a helical or spiral configuration about a solid central axis 15. In one aspect of the invention, the helical orientation of the blades can be configured as logarithmic spirals or Archimedean spirals. A logarithmic spiral can be distinguished from the Archimedean spiral by the fact that the distances between the turnings of a logarithmic spiral increase in geometric progression, while in an Archimedean spiral these distances are constant. Logarithmic spirals are self-similar in that they are self-congruent under all similarity transformations (scaling them gives the same result as rotating them). Scaling by a factor $e^{2\pi b}$ gives the same as the original, without rotation. They are also congruent to their own involutes, evolutes, and the pedal curves based on their centers. In one aspect of the invention, the blades are configured to form a "golden spiral." A golden spiral is a logarithmic spiral that grows outward by a factor of approximately 1.618 for every 90 degrees of rotation (pitch about 17.03239 degrees). The use of logarithmic spirals and Archimedean spirals may be used to optimize different wind profiles and blade orientation designs as suits a particular purpose.

While the logarithmic spiral and Archimedes spiral are specifically referenced above, it should be appreciated that other spiral configurations can be utilized. For example, a conic spiral, Fermat's spiral, Fibonacci spiral, hyperbolic spiral, or other geometric spiral could be utilized in connection with the invention described herein. Additionally, in one embodiment of the invention, the blades of the propeller 10 have a convex or concave geometry with respect to a central axis 15. It is believed that in some applications, a convex or concave geometry will assist in optimizing rotation.

Referring again to FIGS. 1 through 4, the blades 5a, 5b, and 5c extend longitudinally along a central axis 15 and spiral about the central axis 15 from a proximal end 20 of the propeller 10 to a distal end 25 of the propeller 10. The blades 5a, 5b, 5c begin at points within the same plane approximating the shape of a circle. The center of the circle is collinear with a central axis 15 of the propeller 10. It is believed that the air passing through the propeller 10 will create lift forces which act upon the blades 5a, 5b, 5c more efficiently than traditional propeller designs.

While reference is made to a propeller 10 with three blades, it is important to note that other configurations with more or less blades are contemplated herein. As noted above, the number, pitch, twist, and orientation of the blades 5a, 5b, 5c will vary depending on the desired application. In accordance with one aspect of the invention, the blades 5a, 5b, 5c are interconnected at different locations along the central axis 15 with a rigid member 30. A plurality of bottom rigid members 31 are connected to the central axis 15 and each of the three blades 5a, 5b, 5c. The rigid members 30 extend laterally outward from central axis 15 and are integrated into the top face 6 of the blade about the middle of the width of the blade at location 7. In one aspect of the invention, the blades 5a, 5b, 5c are positioned in such a manner that the faces of the blades 5a, 5b, 5c are substantially parallel with the central axis 15. As the blades 5a, 5b, 5c travel upward about the central axis 15 of the propeller 10, the orientation of the blades 5a, 5b, 5c changes from a vertical orientation (i.e., substantially parallel to the central axis 15) to a substantially horizontal orientation (i.e., substantially perpendicular to the central axis 15). In one aspect of the invention, a significant part of the transition from a vertical to horizontal orientation occurs towards the bottom portion of the propeller 10. In another aspect, the transition is more gradual near the bottom portion of the propeller 10 and a more significant transition occurs towards the top of the propeller 10.

While reference is made herein to vertical and horizontal blade orientations, said orientation is made assuming the propeller 10 is in a vertical or upright orientation. That is, the central axis 15 is substantially parallel to a direction of gravity. While that reference is made to describe the shape of the blades 5a, 5b, 5c with respect to one another and the central axis 15, it is understood that in operation, the propeller 10 may be placed in an overall horizontal orientation. That is, the central axis 15 is substantially perpendicular to a direction of gravity. However, the understanding of vertical and/or horizontal blade positioning should be made assuming the propeller 10 is in an upright position.

With reference now to FIGS. 5-8, a three-blade configuration in accordance with one embodiment of the present invention is disclosed. Each of the blades 50a, 50b, and 50c, of the propeller 100 comprise a helical or spiral configuration about a solid central axis 150. In one aspect of the invention, the helical orientation of the blades 50a, 50b, 50c can be configured as logarithmic spirals or Archimedean spirals. A logarithmic spiral can be distinguished from the Archimedean spiral by the fact that the distances between the turnings of a logarithmic spiral increase in geometric progression, while in an Archimedean spiral these distances are constant. In the aspect shown in FIGS. 5-8, the orientation of the blades 50a, 50b, 50c transitions from a near vertical orientation at the bottom area 60 of the propeller 100 to a near horizontal orientation at the top area 65 of the propeller 100. In one aspect of the invention, the rate of the transition is logarithmic. Internal edges 54 of blades 50a, 50b, 50c are in contact with the central shaft or axis 150 such that there is no space between the internal edge 54 of the blades 50a, 50b, 50c and the central shaft or axis 150. In one aspect of the invention, the bottom side 51 of each blade 50a, 50b, 50c measured from an internal or inside edge 54 to an external or outside edge 55 is substantially planar. It is believed that in certain aspects, cupped blades decrease the overall efficiency of the propeller 100 resulting in a "stalling" of the propeller 100. In other aspects, however, the bottom side 51 may be cupped as suits a particular application (See e.g., FIGS. 1-4 above).

In accordance with one aspect of the technology, a vertically oriented propeller 100 comprises a central shaft 150 oriented in a position that is normal to the surface of the ground and normal to a direction of fluid F (e.g., wind or water) flow. A plurality of blades 50a, 50b, 50c emanate from the central shaft 150, wherein each one of the plurality of blades 50a, 50b, 50c comprises an outside edge 55 and an inside edge 54, wherein the inside edge 54 is coupled to the central shaft 150. In one aspect of the technology, the length of the outside edge 55 from the top of the blade to the bottom of the blade is longer than the length of the inside edge 54 measured from the top of the blade to the bottom of the blade. This is due to the difference in the turn rates of the inside edge 54 and the outside edge 55 of the blades 50a, 50b, 50c about the central shaft 150. In one aspect of the technology, the outside edge 55 of each one of the plurality of blades 50a, 50b, 50c has a beginning position that is co-planar with a bottom portion 150a of the central shaft 150 and extends a distance away from the central shaft 150. The outside edge 55 of the blade extends upward curving around at a continuously varying rate of increasing distance away from the central shaft 150. However, in another aspect, the outside edge 55 of the blade extends upward curving around the central shaft 150 at a constant rate of increasing distance from the central shaft 150. In one aspect, the rate at which the outside edge 55 of the blade moves away from the central shaft 150 varies at a geometric rate. In another aspect, the rate at which the outside edge 55 of the blade moves away from the central shaft 150 varies at a logarithmic rate. In yet another aspect, the outside edge 55 of the blade forms an Archimedes spiral about the central shaft 150. In addition, the inside edge 54 of the blades spirals around the central shaft 150. In one aspect, the turn rate of the inside edge 54 of the blades about the central shaft 150 is less than the turn rate of the outside edge 55 of the blades about the central shaft 150.

In accordance with one aspect of the technology, each one of the blades 50a, 50b, 50c comprises a first thickness near the inside edge 54 of the blade and a second thickness near the outside edge 55 of the blade wherein the first thickness is less than the second thickness. A central shaft 150 is oriented in a position that is normal to the surface of the ground and normal to a direction of fluid flow F. A plurality of blades 50a, 50b, 50c emanating from the central shaft 150 comprises an outside edge 55 and an inside edge 54, wherein the inside edge 54 is attached directly to an outside surface of the central shaft 150. A top surface 62 of the blade is substantially parallel to the central shaft 150 at a beginning point 61 of the surface 62 of the blade is substantially perpendicular to the central shaft 150 at an ending point 63 of the blade. In other words, an ending edge 63 of the blades 50a, 50b, 50c is substantially perpendicular to the central axis 150 and a beginning edge 61 of the blades 50a, 50b, 50c is substantially parallel to the central axis 150. In addition, in accordance with on aspect of the technology the ending edge 63 of the blades 50 is disposed lower than an adjacent portion of the blade forming a cupped shape on the distal end of the blade. However, in another aspect, the ending edge 63 is not disposed below an adjacent portion of the blade, the distal end of the blade being substantially flat (i.e., parallel with the ground surface).

In another aspect of the technology, one or more channels is disposed within each one of the blades 50a, 50b, 50c extending from a beginning point 61 of the blade to an ending point 63 of the blade. In one aspect, the channel has a depth that ranges from ¼ to ¾ the total thickness of the blade. Accordingly, in an aspect where the thickness of the blade varies from an inside portion of the blade to an outside portion of the blade, the depth of the channel will also vary. In another aspect, however, the depth of the channel is consistent across the blade regardless of any variation in the thickness of the blade. In another aspect, the channel comprises an aperture or pass-through hole in the blade itself.

In another aspect of the technology, the total volume between opposing blades varies as the blade extends upward from a beginning point 61 to the ending point 63. That is, as the blades 50a, 50b, 50c begin to spiral and convert from a substantially upright orientation to a substantially horizontal orientation, the volume between adjacent blades becomes smaller. In accordance with one aspect of the technology, the ratio of the volume between adjacent blades varies from 2:1 to 5:1. That is, the ratio of the volume between adjacent blades in the "open area" (e.g., the bottom ⅞ to ½ of the propeller 100) to the volume between adjacent blades in the "closed area" (e.g., the top ⅛ to ½ of the propeller 100) ranges from approximately 2:1 to 5:1.

In accordance with one aspect of the technology, the propeller 100 is coupled to vertical-axis wind turbines (VAWT) wherein the central shaft 150 is set transverse to the wind (but not necessarily vertically) while the main components (e.g., the generator) are located at the base of the turbine. This arrangement allows the generator and gearbox to be located close to the ground, facilitating service and repair. VAWTs do not need to be pointed into the wind which removes the need for wind-sensing and orientation mechanisms. A challenge facing vertical axis wind turbine technology is dynamic stall of the blades as the angle of attack varies rapidly. It is believed that aspects of the current technology minimizes dynamic stalling of VAWTs. While specific reference is made herein to a VAWT, it is understood that certain aspects of the technology described herein may be employed in connection with a horizontal wind turbine. In another aspect, aspects of the technology may be used as a propulsion device. That is, the propeller may be coupled to a drive train and turned to provide thrust to power a vehicle.

Figure 9:
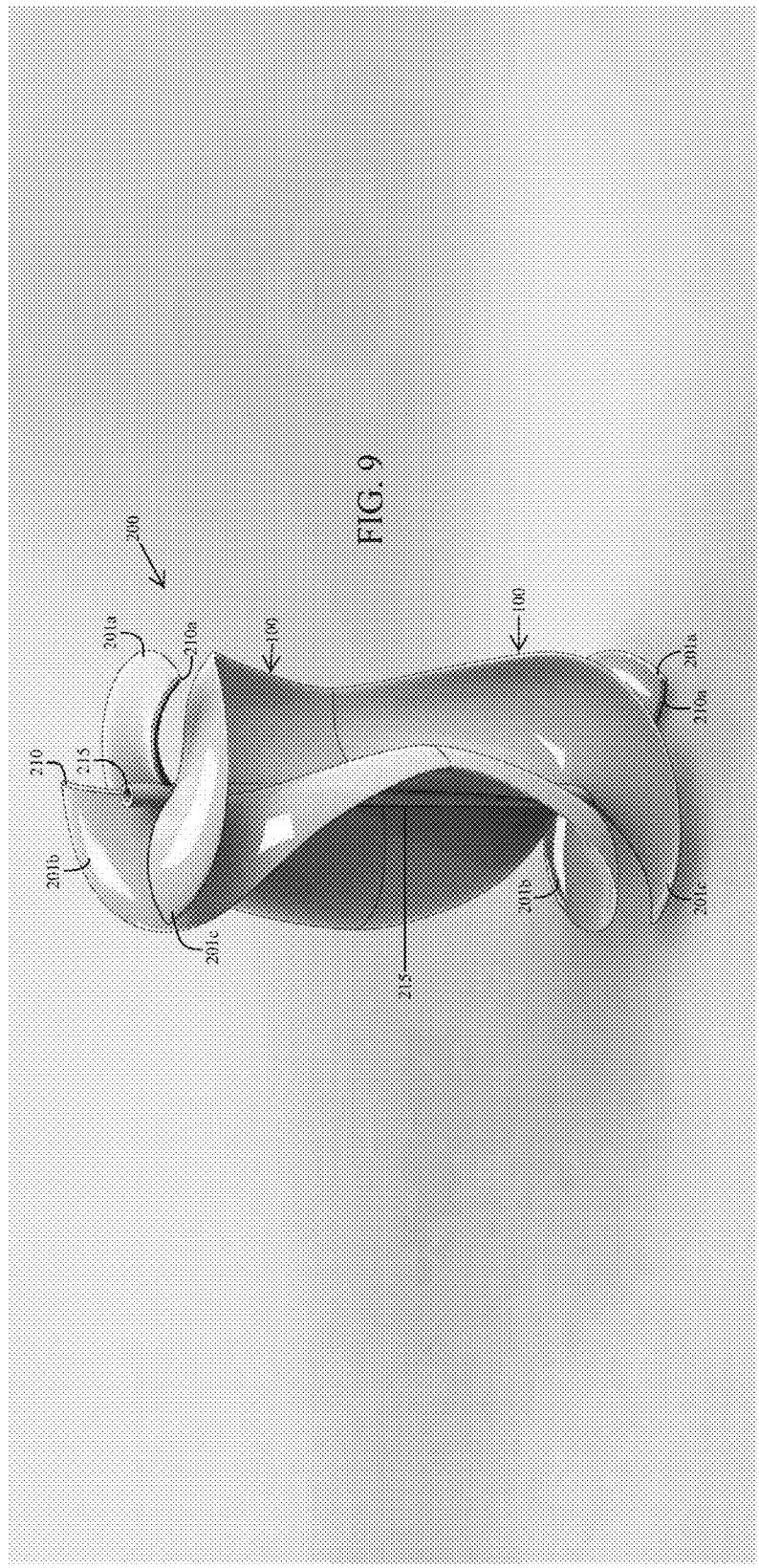
FIG. 9 is a perspective view of a three blade propeller in accordance with one embodiment of the present invention.
Figure 10:
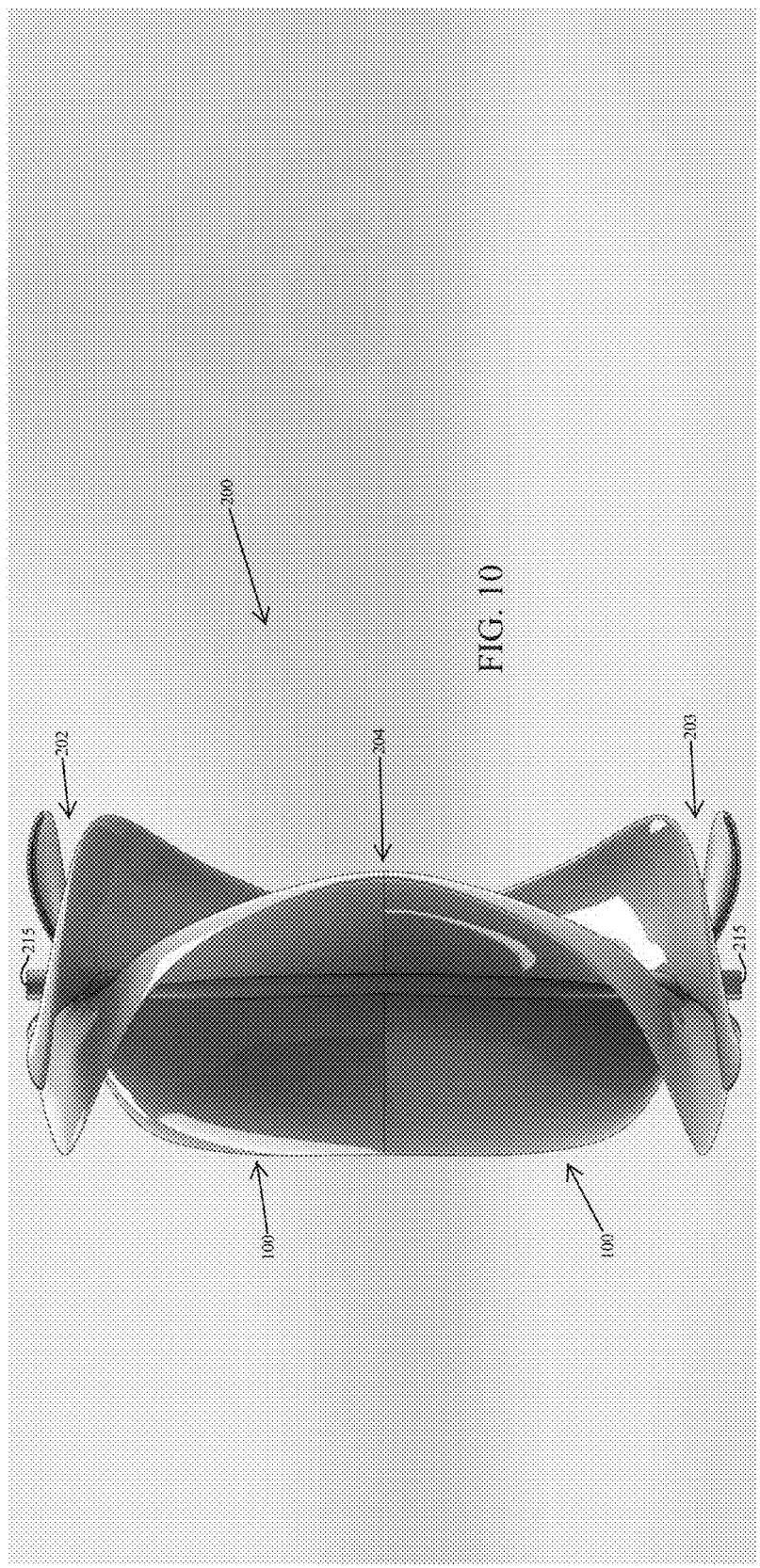
FIG. 10 is a perspective view of a three blade propeller in accordance with one embodiment of the present invention.

With reference now to FIGS. 9-10, in accordance with one aspect of the technology, a propeller 200 is disclosed that effectively comprises a combination of propeller 100 and its mirror image about a plane that is disposed about a bottom of propeller 100. That is, the propeller 200 comprises a plurality of blades 201a, 201b, 201c that are coupled to a central axis 215. The blades 201 are formed in a "closed" arrangement near a top 202 and bottom 203 portion of the propeller meaning that the area between adjacent blades is smaller than the area between those portions. The middle 204 of the propeller, with respect to a longitudinal axis of the propeller 200, is in an "open" arrangement meaning that the area between adjacent blades is greater than the top and bottom sections. In accordance with one aspect, the open area of the blade creates "cupped" section intended to gather wind and turn the propeller 200. Additionally, in accordance with one aspect, an end point 210 of a blade 201 near a top 202 of the propeller 200 is vertically aligned with an end point 210 of the same blade 201 near a bottom 203 of the propeller. While the terms "top" and "bottom" are used herein, because one section is a mirror image of the other, the propeller could be vertically transposed without any change in its function.

Figure 11:
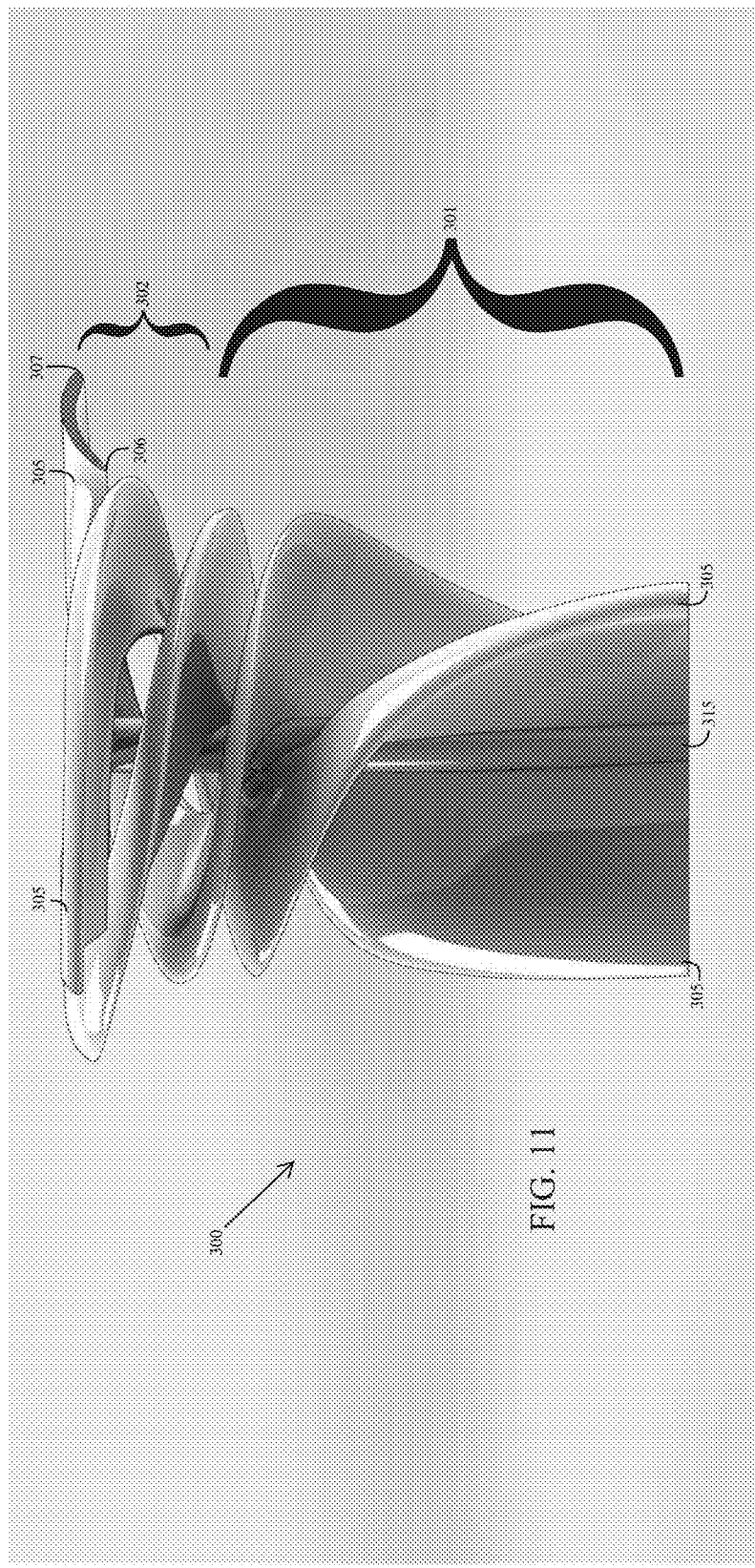
FIG. 11 is a perspective view of a three blade propeller in accordance with one embodiment of the present invention.

With reference now to FIGS. 11-13, in accordance with one aspect of the technology, a propeller 300 is disclosed. Propeller 300 comprises a bottom section 301 what is identical to propeller 100. Unlike the propeller 100, propeller 300 comprises an upper portion 302 wherein an internal edge of the plurality of blades 305 are disconnected from the central axis 315. That is, a bottom section 301 comprises a plurality of blades 305 that have an internal edge that remains in direct contact with the central axis or shaft 315. When the blades 305 approach the upper portion (e.g., the upper ⅓ of the propeller 300), they are no longer connected directly to the shaft by their internal edge. Rather, in one aspect, the blades 305 are coupled to the central shaft 315 by one or more rigid members 308 that extend laterally outward from the central shaft 315. The upper section 302 of propeller 300 comprises blades 305 that whose internal edge 306 expands outward away from the central shaft 315 in the form of a logarithmic spiral. Likewise, an external edge 307 of the blades expands outward away from the central shaft 315 in the form of a logarithmic spiral.

In accordance with one aspect of the technology, the gear box comprises a turbine "governor" or device that limits the top speed that the propeller will turn in order to minimize stalling. In accordance with one aspect, the governor comprises a clutch or other spring-loaded device that frictionally engages the central axis of the propeller when the propeller reaches a rotational velocity that exceeds and predetermined threshold. In accordance with one aspect, the spring loaded device is coupled to a turbine arrangement (e.g., a stator and rotator assembly) that generates electricity based on the turning of the propeller. In this manner, while the primary turbine is utilized to generate electricity from the turning of the propeller, a secondary turbine may engage the propeller in an effort to maximize the harvesting of available energy from the propeller while limiting its maximum rotational speed.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

The invention claimed is:

1. A vertically oriented propeller, comprising:
   a central shaft oriented in a position that is normal to the surface of the ground and normal to a direction of fluid flow;
   a plurality of blades emanating from the central shaft, wherein each one of the plurality of blades comprises an outside edge and an inside edge, wherein the inside edge is coupled to the central shaft;
   wherein the length of the outside edge of each one of the plurality of blades is longer than the length of the inside edge; and
   wherein each one of the blades comprises a first thickness near the inside edge of the blade and a second thickness near the outside edge of the blade and wherein the first thickness is less than the second thickness.

2. The propeller of claim 1, wherein the outside edge of each one of the plurality of blades has a beginning position that is co-planar with a bottom portion of the central shaft and extends a distance away from the central shaft.

3. The propeller of claim 2, wherein the outside edge of the blade extends upward curving around at a continuously varying rate of increasing distance away from the central shaft.

4. The propeller of claim 2, wherein the outside edge of the blade extends upward curving around the central shaft at a constant rate of increasing distance from the central shaft.

5. The propeller of claim 3, wherein the rate at which the outside edge of the blade moves away from the central shaft varies at a geometric rate.

6. The propeller of claim 3, wherein the rate at which the outside edge of the blade moves away from the central shaft varies at a logarithmic rate.

7. The propeller of claim 3, wherein the outside edge of the blade forms an Archimedes spiral about the central shaft.

8. The propeller of claim 3, wherein the inside edge of the blades spirals around the central shaft.

9. The propeller of claim 8, wherein the turn rate of the inside edge of the blades about the central shaft is less than the turn rate of the outside edge of the blades about the central shaft.

10. A vertically oriented propeller, comprising:
- a central shaft oriented in a position that is normal to the surface of the ground and normal to a direction of fluid flow;
- a plurality of blades emanating from the central shaft, wherein each one of the plurality of blades comprises an outside edge and an inside edge, wherein the inside edge is attached directly to an outside surface of the central shaft;
- wherein a top surface of the blade is substantially parallel to the central shaft at a beginning point of the blade and is substantially perpendicular to the central shaft at a mid point of the blade; and
- wherein a bottom surface of the blade is substantially parallel to the central shaft at an ending point of the blade and is substantially perpendicular to the central shaft at the mid point of the blade.

11. The propeller of claim 10, wherein the outside edge of the blade extends upward from the mid point of the blade, curving around the central shaft at a continuously varying rate of increasing distance away from the central shaft while moving parallel to the central shaft.

12. The propeller of claim 10, wherein the outside edge of the blade extends upward from the mid point of the blade, curving around at a continuously varying rate of increasing distance away from the central shaft.

13. The propeller of claim 11, wherein the inside edge of the blades curves around the central shaft in the same direction as the direction of the curve of the outside edge.

14. The propeller of claim 13, wherein the turn rate of the inside edge of the blades about the central shaft is less than the turn rate of the outside edge of the blades about the central shaft.

15. A vertically oriented propeller, comprising:
- a central shaft oriented in a position that is normal to the surface of the ground and normal to a direction of fluid flow;
- a plurality of blades emanating from the central shaft, wherein each one of the plurality of blades comprises an outside edge and an inside edge, wherein the inside edge is attached directly to an outside surface of the central shaft;
- wherein the outside edge of the blade extends upward curving around the central shaft and wherein the inside edge of the blade extends upward curving around the central shaft; and
- wherein an area between adjacent blades near a top portion of the central shaft is less than an area between adjacent blades near a bottom portion of the central shaft.

16. The propeller of claim 15, wherein the length of the inside edge of each of the blades comprises a first length and the length of the outside edge of the blades comprises a second length and wherein the first length is shorter than the second length.

17. The propeller of claim 16, wherein an ending edge of each of the blades is substantially parallel to a central axis and a beginning edge of each of the blades is substantially normal to the central axis.

18. The propeller of claim 16, further comprising a generator attached to the propeller and located directly beneath the propeller.

* * * * *